(12) United States Patent
Mochida

(10) Patent No.: US 12,509,064 B2
(45) Date of Patent: Dec. 30, 2025

(54) PARKING ASSISTANCE DEVICE

(71) Applicant: TOYOTA JIDOSHA KABUSHIKI KAISHA, Aichi (JP)

(72) Inventor: Tsutomu Mochida, Shizuoka-ken (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 112 days.

(21) Appl. No.: 18/613,109

(22) Filed: Mar. 22, 2024

(65) Prior Publication Data
US 2024/0326785 A1    Oct. 3, 2024

(30) Foreign Application Priority Data
Mar. 28, 2023   (JP) ................................ 2023-051992

(51) Int. Cl.
B60W 30/06    (2006.01)
B62D 6/00     (2006.01)
B62D 15/02    (2006.01)

(52) U.S. Cl.
CPC ............. B60W 30/06 (2013.01); B62D 6/002 (2013.01); B62D 15/0285 (2013.01)

(58) Field of Classification Search
CPC .... B60W 30/06; B62D 6/002; B62D 15/0285
See application file for complete search history.

(56) References Cited

U.S. PATENT DOCUMENTS

| | | | | |
|---|---|---|---|---|
| 6,053,270 A * | 4/2000 | Nishikawa | ............... | B62D 1/10 701/41 |
| 9,522,661 B2 * | 12/2016 | Inoue | ................... | B60T 8/86 |
| 9,604,638 B2 * | 3/2017 | Kiyokawa | ............. | B60W 30/06 |
| 9,738,276 B2 * | 8/2017 | Kiyokawa | ............. | B60K 35/28 |
| 9,828,028 B2 * | 11/2017 | Ishijima | .................. | B62D 6/00 |
| 9,836,658 B2 * | 12/2017 | Kiyokawa | .......... | B62D 15/0285 |
| 9,875,655 B2 * | 1/2018 | Kiyokawa | ............ | B62D 15/028 |
| 10,031,227 B2 | 7/2018 | Kiyokawa et al. | | |
| 10,150,486 B2 * | 12/2018 | Hoshino | ................ | B60K 35/28 |
| 10,239,520 B2 * | 3/2019 | Tomozawa | ............ | B60W 30/06 |
| 10,377,416 B2 * | 8/2019 | Fukukawa | ........... | B62D 15/025 |

(Continued)

FOREIGN PATENT DOCUMENTS

DE   102019105476 A1   9/2020
EP   2837546 A1   2/2015

(Continued)

OTHER PUBLICATIONS

Office Action in JP Application No. 2023-051992, mailed Jun. 17, 2025, 6pp.

Primary Examiner — Sihar A Karwan
(74) Attorney, Agent, or Firm — HAUPTMAN HAM, LLP (57) ABSTRACT

A parking assistance device that includes an actuating device that automatically steers steered wheels by actuating a steering device, and an electronic control unit that controls the actuating device, and the electronic control unit is configured to control the actuating device such that a vehicle moves to a target parking position when a command for parking assistance is received, in which the electronic control unit is further configured to perform, when parking has been completed, a first steering angle correction that controls the actuating device such that the steering angle changes by a first target steering angle correction amount toward the side opposite to a present steering angle with respect to a target steering angle.

5 Claims, 5 Drawing Sheets

(56) References Cited

U.S. PATENT DOCUMENTS

| | | | |
|---|---|---|---|
| 11,904,938 B2* | 2/2024 | Zhu | G05D 1/021 |
| 11,919,568 B2* | 3/2024 | Lavoie | B62D 15/0285 |
| 2009/0306856 A1* | 12/2009 | Fritz | B62D 5/008 |
| | | | 701/42 |
| 2012/0215406 A1* | 8/2012 | Tanimoto | B62D 15/025 |
| | | | 701/41 |
| 2016/0075329 A1* | 3/2016 | Tomozawa | B60W 10/20 |
| | | | 701/41 |

FOREIGN PATENT DOCUMENTS

| | | |
|---|---|---|
| JP | 5807766 B2 | 11/2015 |
| JP | 2016-060223 A | 4/2016 |

* cited by examiner

PARKING ASSISTANCE DEVICE

CROSS-REFERENCE TO RELATED APPLICATION

This application claims priority to Japanese Patent Application No. JP2023-51992 filed on Mar. 28, 2023, the content of which is hereby incorporated by reference in its entirety into this application.

BACKGROUND

1. Technical Field

The present disclosure relates to a parking assistance device for a vehicle such as an automobile.

2. Description of the Related Art

As a parking assistance device for a vehicle such as an automobile, a parking assistance device is known in which a target parking position and a target path from a present position to the target parking position are set, and a vehicle is moved to the target parking position by automatically steering steered wheels and parked.

In parking assistance by a parking assistance device, when a vehicle starts from a parking position, it is preferable that steered wheels be controlled to or near a straight ahead position of the vehicle by controlling a steering angle to 0° or its vicinity so that the vehicle does not move in a direction that is not intended by a driver.

For example, a paragraph in Japanese Patent Application Laid-Open No. 2016-60223 describes a parking assistance device configured to set a steering angle at the time of completion of parking to 0° by setting a target path consisting of an arc-clothoid curve-arc-straight line or an arc-clothoid curve-straight line.

When a road width or a space around a target parking position is limited, it is impossible to set a complicated target path as in the parking assistance device described in the above publication. To cope with this problem, it is conceivable that steered wheels are automatically steered to or near a straight ahead position of a vehicle after completion of parking, so that a steering angle is controlled to 0° or its vicinity.

However, when steered wheels are moved by automatic steering to a straight ahead position of a vehicle or its vicinity and a steering force is released after completion of parking, a steering angle of the steered wheels change so as to return in a direction opposite to a direction of the automatic steering due to release of elastic deformation of tires of the steered wheels and steering members. Therefore, since the steering angle is changed so as to return in a direction opposite to the direction of the automatic steering, the steering angle cannot be controlled to 0° or its vicinity.

SUMMARY

The present disclosure provides an improved parking assistance device in which the possibility of bringing a steering angle closer to a target steering angle such as 0° or its vicinity is increased by performing a correction control of the steering angle in which steered wheels are moved by automatic steering in anticipation of a return change in the steering angle.

In accordance with the present disclosure, there is provided a parking assistance device that includes a steering device provided between a steering wheel and steered wheels, an actuating device that automatically steers the steered wheels by actuating the steering device, and an electronic control unit that controls the actuating device, and the electronic control unit being configured to control the actuating device such that a vehicle moves to a target parking position when a command for parking assistance is received.

The electronic control unit includes a storage device that stores an expected return amount of a steering angle, and is configured to, when parking has been completed, with a sum of a magnitude of a present steering angle and an initial value of the expected return amount being set as a first target steering angle correction amount, perform a first steering angle correction that controls the actuating device such that the steering angle changes by the first target steering angle correction amount toward the side opposite to the present steering angle with respect to a target steering angle.

According to the above-described configuration, when parking has been completed, the first steering angle correction control for controlling the actuating device is performed so that the steering angle changes by the first target steering angle correction amount which is the sum of a magnitude of a present steering angle and an initial value of the expected return amount toward the side opposite to the present steering angle with respect to the target steering angle.

Therefore, it is possible to increase the possibility of bringing the steering angle closer to the target steering angle as compared to where an initial value of the expected return amount is not considered and the actuating device is controlled so that the steering angle changes by the magnitude of the present steering angle.

In another aspect of the present disclosure, the electronic control unit is configured to, when a steering angle after the (n−1)th steering angle correction control has been completed, where n is a positive integer, exceeds a non-control range, calculate a magnitude of the nth return amount of the steering angle after the nth steering angle correction control has been completed based on a magnitude of the return amount of the steering angle after the (n−1)th steering angle correction control has been completed and a magnitude of the steering angle after the nth steering angle correction control has been completed, calculate a (n+1)th target steering angle correction amount based on the magnitude of the steering angle after the nth steering angle correction control has been completed and the nth return amount of the steering angle, and perform the (n+1)th steering angle correction control for controlling the actuating device such that the steering angle changes by the (n+1)th target steering angle correction amount toward the side opposite to the steering angle after the nth steering angle correction control has been completed with respect to the target steering angle.

According to the above-described aspect, it is possible to calculate a magnitude of a return amount of the steering angle for each steering angle correction control and repeatedly perform the steering angle correction control on the basis of the steering angle and the return amount of the steering angle after the steering angle correction control has been completed such that the steering angle approaches the target steering angle.

Further, in another aspect of the present disclosure, the electronic control unit is configured not to perform the (n+1)th steering angle correction control when a steering angle after the nth steering angle correction control has been completed is within the non-control range, or when a steering angle after the nth steering angle correction control has been completed is outside the non-control range and n is equal to or greater than a reference value.

According to the above-described aspect, it is possible to prevent the steering angle correction control from being performed unnecessarily repeatedly.

Further, in another aspect of the present disclosure, the storage device is a non-volatile readable and writable storage device, and the electronic control unit is configured to update an initial value of the expected return amount with the magnitude of the nth return amount of the steering angle when the steering angle after the nth steering angle correction control has been completed is within the non-control range.

According to the above-described aspect, since the initial value of the expected return amount can be updated with the magnitude of the return amount of the steering angle when the steering angle correction control has been performed, in contrast to where the initial value of the expected return amount is constant, the steering angle correction control can be performed in accordance with an actual return change of the steering angle.

Further, in another aspect of the present disclosure, the storage device stores initial values of return amounts of the steering angle for a plurality of outside air temperature sections, and the electronic control unit is configured to, when a steering angle after the nth steering angle correction control has been completed is within the non-control range, acquire information on an outside air temperature, and update the initial value of the return amount of the steering angle for the section to which the outside air temperature belongs with the magnitude of the nth return amount of the steering angle.

According to the above-described aspect, for each section of the outside air temperature, the initial value of the expected return amount can be updated with the magnitude of the return amount of the steering angle when the steering angle correction control has been performed. Therefore, in contrast to where the initial value of the expected return amount of each section of the outside air temperature is constant, the steering angle correction control can be performed in accordance with an actual return change of the steering angle.

Other objects, other features and attendant advantages of the present disclosure will be readily understood from the description of embodiments of the disclosure described with reference to the following drawings.

DETAILED DESCRIPTION OF THE DISCLOSURE

Embodiments of the disclosure will now be described in detail with reference to the accompanying drawings.

Figure 1:
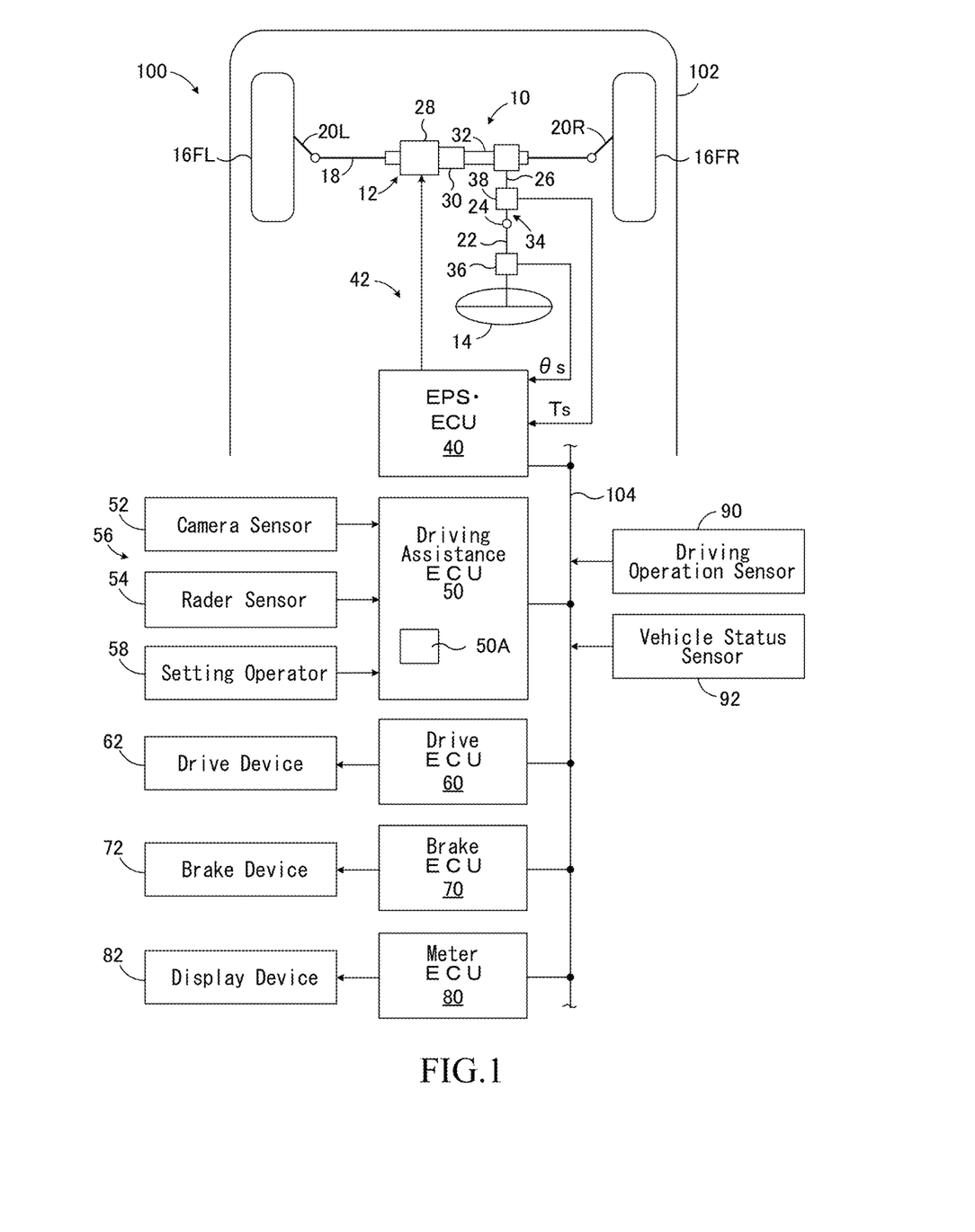
FIG. 1 is a schematic configuration diagram illustrating a parking assistance device according to an embodiment.

As shown in FIG. 1, a parking assistance device 100 according to an embodiment is applied to a vehicle 102 and includes a steering device 10, an electric power steering ECU 40, and a driving assistance ECU 50. The vehicle 102 may be a vehicle capable of automated driving and includes a drive ECU 60, a brake ECU 70, and a meter ECU 80. In this description, an electric power steering is referred to as EPS by abbreviating Electric Power Steering as required.

The EPS-ECU 40, the driving assistance ECU 50, and other ECUs are electronic controllers that each include a microcomputer as a main part, and are connected to each other via a CAN, i.e., Controller Area Network 104. Each microcomputer may include a CPU, a ROM, a RAM, a non-volatile memory and an interface. The CPU is adapted to realize various functions by executing instructions, such as programs and routines stored in the ROM. These ECU may be integrated into one ECU.

As shown in FIG. 1, the steering device 10 includes an EPS device 12 connected to the EPS-ECU 40, and the EPS device 12 is configured as a rack-and-pinion type EPS device which is driven in response to an operational control on a steering wheel 14 by a driver. A rack bar 18 of the EPS device 12 is coupled via tie rods 20L and 20R to knuckle arms (not shown) of front wheels 16FL and 16FR which are steered wheels. The steering wheel 14 is connected to a pinion shaft 26 of the EPS device 12 via a steering shaft 22 and a universal joint 24.

In the illustrated embodiment, the EPS device 12 is a rack-assist type electric power steering device including an electric motor 28 and a belt-type conversion mechanism 30 that converts rotation and torque of the electric motor 28 into reciprocating displacement and force and transmits the displacement and force to the rack bar 18. The EPS device 12 generates a control torque by actuating the rack bars 18 relative to a housing 32.

Accordingly, the steering shaft 22, the universal joint 24, the pinion shaft 26, the EPS device 12, and the tie-rods 20L, 20R constitute a steering transmission system 34 that transmits steering displacement and torque between the steering wheel 14 and the front wheels 16FL and 16FR. The EPS device 12 functions as a torque applying device that applies control torque to the steering transmission system 34.

The steering shaft 22 is provided with a steering angle sensor 36 that detects a steering angle θ, and the pinion shaft 26 is provided with a steering torque sensor 38 that detects a steering torque Ts. A steering torque sensor 38 may be provided on the steering shaft 22.

The steering angle θ and the steering torque Ts become positive when the vehicle 102 turns to the right by steering operation by the driver. Therefore, the steering torque Ts becomes a positive value when the relative rotation of a member on the side of the steering wheel 14 and a member on the side of the EPS device 12 with respect to a torsion bar (not shown) of the steering torque sensor 38 is a relative rotation corresponding to the right turning direction of the vehicle. The EPS device 12 may be a pinion-assist type or column-assist type EPS device as long as it applies a control torque to the steering transmission system 34.

The EPS-ECU 40 controls the EPS device 12 based on a steering torque Ts and a vehicle speed V detected by the steering torque sensor 38 included in a driving operation sensor 90 and a vehicle status sensor 92, respectively, which will be described later, in a manner known in the art, thereby controlling a steering assist torque and reducing steering burden of the driver. The EPS-ECU 40 can also steer the front wheels 16FL and 16FR as needed by controlling the EPS device 12. Accordingly, the EPS-ECU 40 and the EPS device 12 function as an automatic steering device 42 that automatically steers the front wheels as needed.

A camera sensor 52 and a radar sensor 54 are connected to the driving assistance ECU 50. The camera sensor 52 and the radar sensor 54 include a plurality of camera devices and a plurality of radar devices, respectively. The camera sensor 52 and the radar sensor 54 function as a target information acquisition device 56 that acquires information on a target at least in front of the vehicle 102. A LIDAR, i.e., Light Detection And Ranging, may be used in place of the radar sensor 54 or in addition to the radar sensor 54.

Furthermore, a setting operator 58 is provided in a position to be operated by the driver and is connected with the driving assistance ECU 50. Although not shown in FIG. 1, in the embodiment, the setting operator 58 includes a parking assistance switch, and the driving assistance ECU 50 executes a parking assistance control when the parking assistance switch is on, and further executes the steering angle control after completion of parking.

The drive ECU 60 is connected to a drive device 62 that drives the vehicle 102 by applying a driving force to the drive wheels not shown in FIG. 1. The drive ECU 60 normally controls the drive device 62 so that a driving force generated by the drive device is changed in response to a driving operation by the driver, and when receiving a command signal from the driving assistance ECU 50, controls the drive device 62 based on the command signal.

The brake ECU 70 is connected with a brake device 72 that decelerates the vehicle 102 by braking by applying braking forces to the wheels not shown in FIG. 1. The brake ECU 70 normally controls the brake device 72 so that the braking forces generated by the brake device changes in response to a braking operation by the driver, and when a command signal is received from the driving assistance ECU 50, performs automatic braking by controlling the brake device 72 based on the command signal.

Connected to the meter ECU 80 is a display 82 that displays a state of the control by the driving assistance ECU 50. The display 82 may be, for example, a head-up display or a multi-information display that displays meters and various information, or may be a display of a navigation device.

The driving operation sensor 90 and the vehicle status sensor 92 are connected to the CAN 104. Information detected by the driving operation sensor 90 and the vehicle status sensor 92 (referred to as sensor information) is transmitted to the CAN 104. The driving operation sensor 90 includes a driving operation amount sensor and a braking operation amount sensor. The vehicle status sensor 92 includes a vehicle speed sensor, a longitudinal acceleration sensor, a lateral acceleration sensor, a yaw rate sensor, and the like.

The driving assistance ECU 50 is a central control device that performs driving assistance controls such as a parking assistance control, a steering angle control after completion of parking, and a lane keeping control. In the embodiment, the driving assistance ECU 50, upon receipt of a driving assistance command, cooperates with the other ECUs to perform the parking assistance control that controls the automatic steering device 42 and other devices to cause the vehicle 102 to move to a target parking position. Note that the parking assistance control does not constitute a gist of the present disclosure, and may be performed in any manner known in the art. Parking by the parking assistance control may be parking performed with an occupant or occupants riding on the vehicle, or remote parking by the driver or other user operating a remote terminal after the driver gets off the vehicle.

Furthermore, the driving assistance ECU 50 executes the steering angle control after completion of parking when the vehicle 102 moves to the target parking position to stop and the parking assistance control has been completed. The steering angle control includes, as will be described in detail later, a steering angle correction control for correcting the steering angle such that when the steering angle after completion of parking exceeds a non-control range, the steering angle approaches the target steering angle and falls within the non-control range. The target steering angle in the embodiments described below is 0°.

First Embodiment

In the first embodiment, the microcomputer of the driving assistance ECU 50 includes a storage device 50A, and the storage device 50A stores an initial value θr0 (a positive constant) of a magnitude of an expected return amount of a steering angle used for steering angle control after completion of parking. Incidentally, the initial value θr0 of the magnitude of the expected return amount may be a value obtained experimentally, for example.

Figure 2:
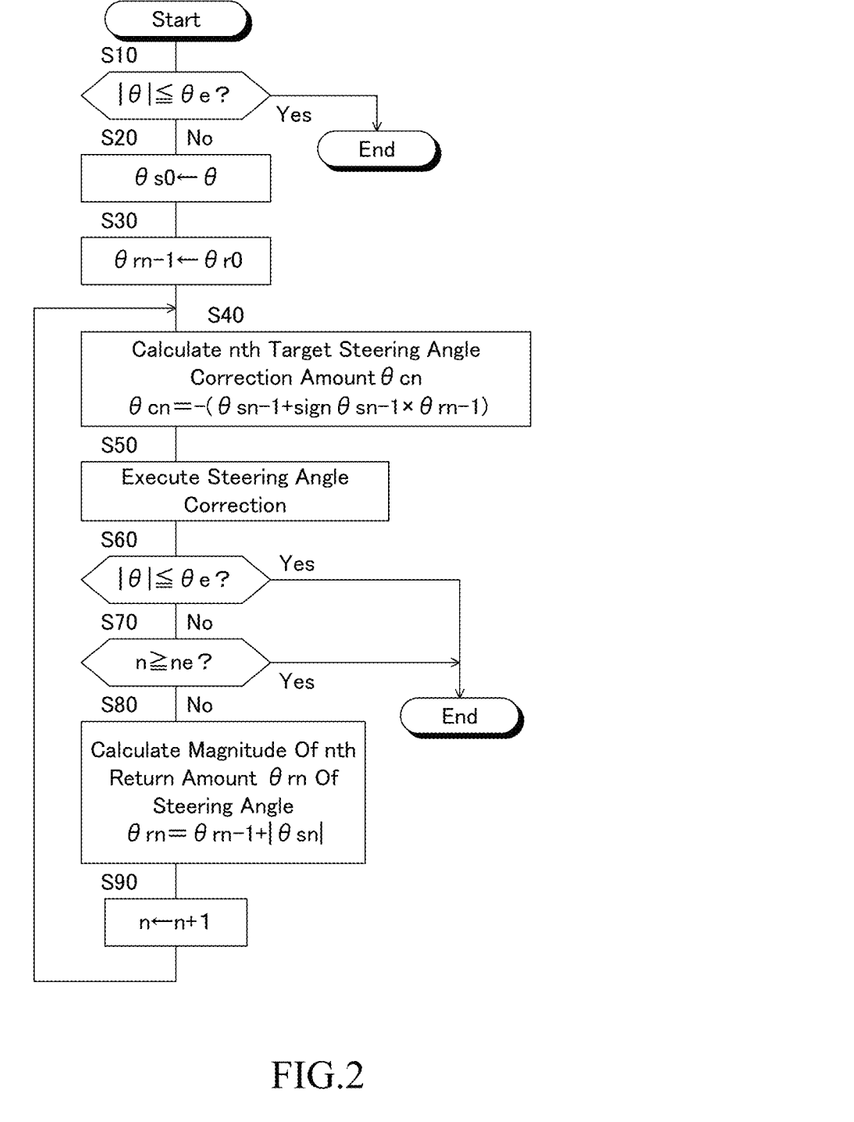
FIG. 2 is a flowchart showing a routine of the steering angle control after completion of parking in the first embodiment.

In the first embodiment, the ROM of the driving assistance ECU 50 stores a program of the steering angle control after completion of parking corresponding to the flowchart shown in FIG. 2. The CPU performs the steering angle control after completion of parking according to this program.

<Steering Angle Control Routine after Completion of Parking in the First Embodiment>

The steering angle control by the flowchart shown in FIG. 2 is repeatedly executed at predetermined time intervals by the CPU of the driving assistance ECU 50 when the parking assistance switch, not shown in FIG. 1, of the setting operator 58 is on and parking by a parking assistance control has been completed. Further, at the start of the steering angle control, n (a positive integer) indicating an execution number of a steering angle correction control to be described later is set to 1, which is the initial value. The same applies to the steering angle control after completion of parking in the other embodiments described below.

First, in step S10, the CPU determines whether or not an absolute value of the steering angle θ is equal to or less than a non-control reference value De (a positive constant), that is, whether or not no steering angle correction control is required. When an affirmative determination is made, the CPU once ends the present control, but when a negative determination is made, the CPU advances the present control to step S20.

In step S20, the CPU sets a steering angle θs0 at the beginning of the first steering angle correction control (n=1) to a present steering angle θ detected by the steering angle sensor 36.

In step S30, the CPU sets a magnitude θrn−1 of a return amount of a previous steering angle used for the first steering angle correction control to the initial value Or stored in the storage device 50A.

In step S40, the CPU calculates a target correction amount θcn of the nth steering angle correction control according to the following equation (1). In the following equation (1), θsn−1 is a steering angle after the (n−1)th steering angle correction control is performed, that is, a steering angle when the steering angle returns due to an elastic deformation of tires or the like being released after the (n−1)th steering angle correction control is performed, and sign θsn−1 is a sign of the steering angle θsn−1. θrn−1 is a magnitude of a return amount of the steering angle after the (n−1)th steering angle correction control is performed, and is a value calculated in the previous step S90.

$$\theta cn = -(\theta sn-1 + \text{sign } \theta sn-1 \times \theta rn-1) \quad (1)$$

Since n of the target correction amount θc1 of the first steering angle correction control is 1, the target correction amount θc1 is calculated according to the following equation (2). θs0 is a steering angle when the parking assistance control has been completed, and hence a steering angle when the first steering angle correction control starts.

$$\theta c1 = -(\theta s0 + \text{sign } \theta s0 \times \theta r0) \quad (2)$$

In step S50, the CPU executes the steering angle correction control by outputting a command signal to the EPS-ECU 40 so that a correction amount of the steering angle correction control becomes the target correction amount θcn. When the target correction amount θcn is a negative value, the EPS device 12 is controlled so that the steering angle θ changes by θsn−1+sign θsn−1×θrn−1 in the left turning direction. Conversely, when the target correction amount θcn is a positive value, the EPS device 12 is controlled so that the steering angle θ changes by θsn−1+ sign θsn−1×θrn−1 in the right turning direction.

In step S60, after waiting for a predetermined time (for example, 100 msec) required for a return change of the steering angle after the steering angle correction control has been completed, the CPU determines whether or not an absolute value of the steering angle θ (=θsn) is equal to or less than the non-control reference value θe as in step S10. When an affirmative determination is made, the CPU determines that the steering angle correction control is no longer required and terminates the present control, but when a negative determination is made, the CPU advances the present control to step S70. The reference value in step S60 may be a value smaller than the reference value θe in step S10.

In step S70, the CPU determines whether or not n, which indicates the number of times of executing the steering angle correction control, is equal to or greater than a reference value ne (for example, a positive constant integer such as 4). When an affirmative determination is made, the CPU once ends the present control, but when a negative determination is made, the CPU advances the present control to step S80.

In step S80, the CPU calculates a magnitude θrn of a return amount of the steering angle after the nth steering angle correction control is performed according to the following equation (3). Upon completion of the calculation of the magnitude θrn of the return amount of the steering angle, the CPU increments n, which indicates the number of times of executing the steering angle correction control, by 1 in step S90, and then returns the present control to step S40.

$$\theta rn = \theta rn-1 + |\theta sn| \quad (3)$$

<Example of Operation of the First Embodiment>

Figure 3:
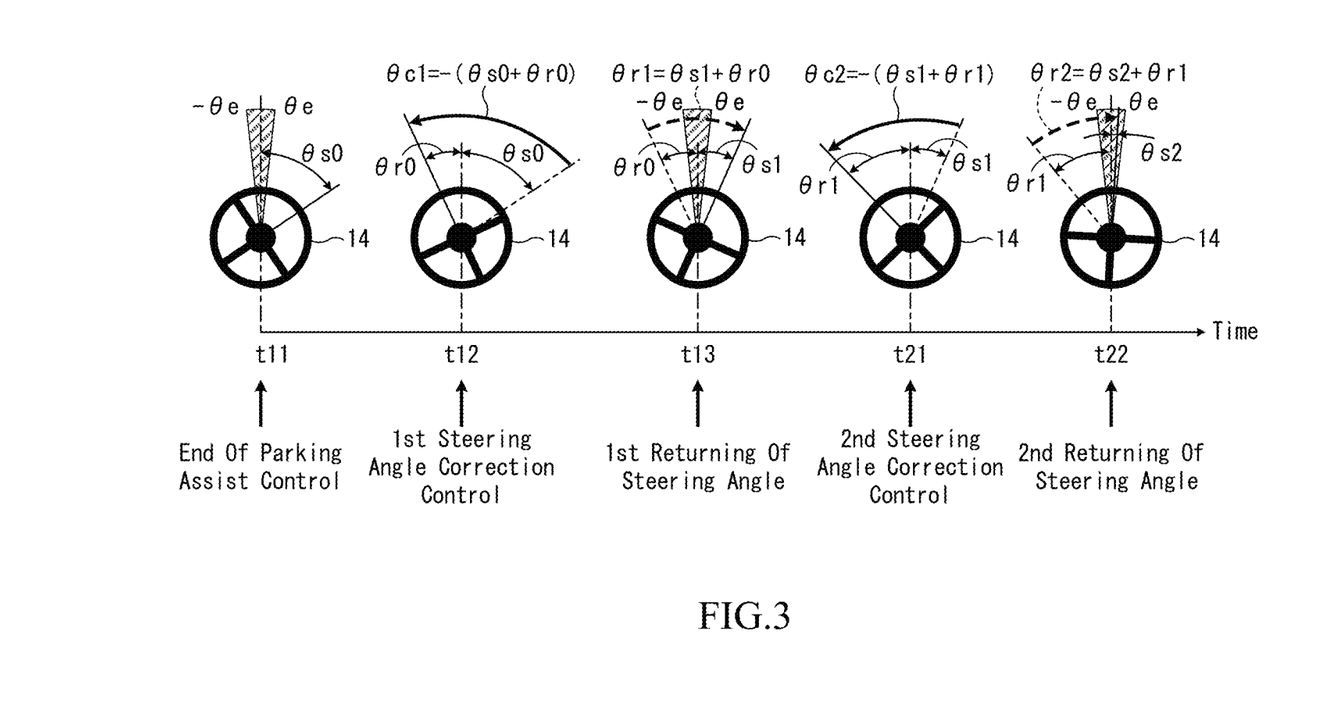
FIG. 3 is an explanatory view showing an operation of the first embodiment.

Next, with reference to FIG. 3, an example of an operation of the first embodiment is explained. Incidentally, a time axis in FIG. 3 is for showing an order of events, so that it does not indicate an accurate elapsed time.

It is assumed that the parking assist control has been completed by the vehicle 102 moving to a target parking position and stopping, and the steering angle control after completion of parking is started. It is assumed that the steering angle θ at the time point t11, which is the time when the first steering angle correction control starts, is θs0 which is larger than the non-control reference value θe.

At the time point t12, the EPS device 12 is controlled so that the steering angle θ changes by θs0+θr0 in the left turning direction by the first steering angle correction control as indicated by the thick solid arrow. However, it is assumed that, due to release of the elastic deformation of the tires and the like, the steering angle θ returns exceeding the straight ahead position (θ=0) of the vehicle to θs1 which is larger than the non-control reference value θe at the time point t13 as indicated by the thick broken arrow.

Since the steering angle at the start of the second steering angle correction control is θs1, a magnitude θr1 of the return amount of the steering angle after the first steering angle correction control is θs1+θr0. The second steering angle correction control controls the EPS device 12 so that, at the time point t21, the steering angle θ changes by θs1+ θr1=2θs1+θr0 in the left turn direction by the second steering angle correction control, as indicated by the thick solid arrow. It is assumed that the steering angle θ becomes θs2 at the time point t22 as indicated by the thick broken arrow due to release of the elastic deformation of the tires and the like.

When an absolute value of θs2 is equal to or less than the non-control reference value De, an affirmative determination is made in step S60, so that the steering angle control after completion of parking ends. In contrast, when the absolute value of θs2 exceeds the non-control reference value θe, since a negative determination is made in step S60, steps S40 and S50 are performed. That is, the steering angle correction control similar to the steering angle correction control at the time t21 described above is executed.

When the absolute value of the steering angle θsn after returning exceeds the non-control reference value θe in spite that the steering angle correction control is repeatedly executed ne times, an affirmative decision is made in step S70, so that the steering angle control after completion of parking ends.

The above-described example is such that a steering angle when the first steering angle correction control starts is the steering angle in the right steering direction. When a steering angle when the first steering angle correction control starts is the steering angle in the left steering direction, the steering angle correction control is performed in the same manner as the above-described example, except that the change direction of the steering angle by the steering angle correction control is reversed.

Second Embodiment

In the second embodiment and the third embodiment described below, the vehicle status sensor 92 includes an outside air temperature sensor that detects an outside air temperature Tout. The storage device 50A is a non-volatile storage device that can be read and written, and as shown in Table 1 below, stores initial values θr0 of magnitudes of estimated return amounts of the steering angle for a plurality of sections of outside air temperature. As will be described later, the initial values θr0 of the magnitudes of the expected return amounts of the steering angle is appropriately updated when the steering angle control after completion of parking ends.

TABLE 1

| Outside Air Temperature Tout (° C.) | Initial Value θr0 Of Magnitude Of Expected Return Amount (deg) |
|---|---|
| Tout < 0 | θr00 |
| 0 ≤ Tout < 10 | θr01 |
| 10 ≤ Tout < 20 | θr02 |
| 20 ≤ Tout < 30 | θr03 |
| 30 ≤ Tut | θr04 |

Figure 4:
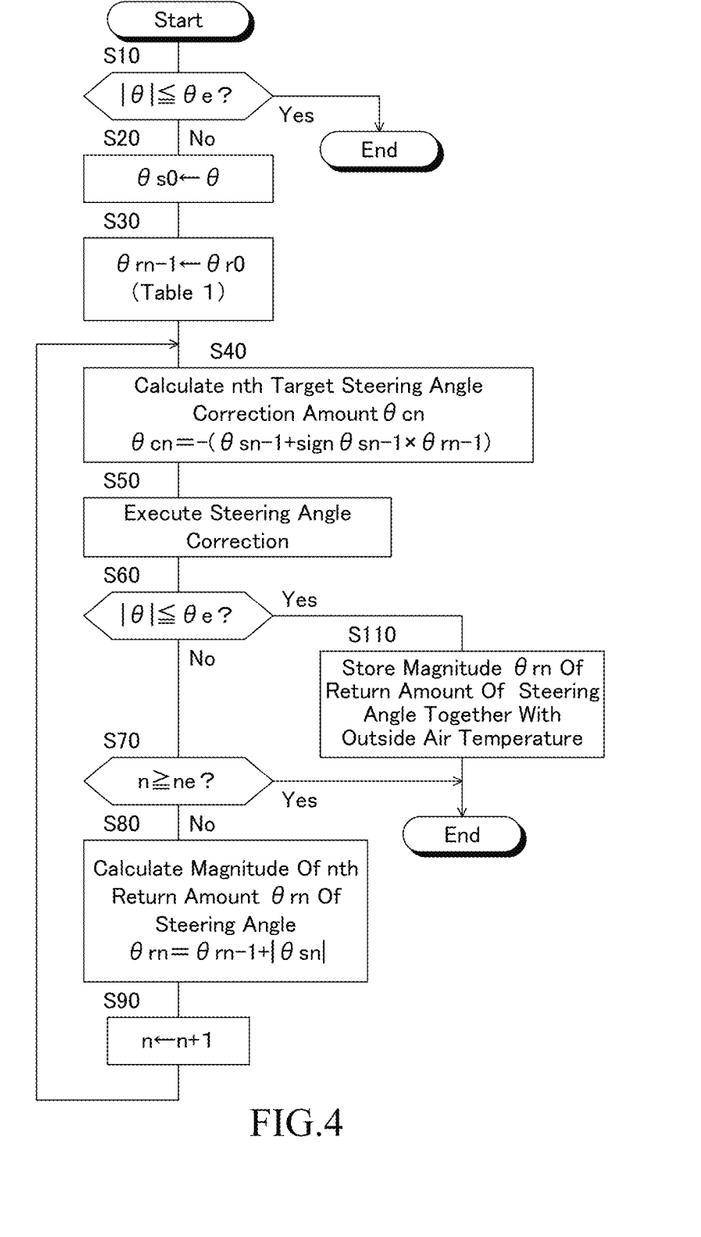
FIG. 4 is a flowchart showing a routine of the steering angle control after completion of parking in the second embodiment.

In the second embodiment, the ROM of the driving assistance ECU 50 stores a program of the steering angle control after completion of parking corresponding to the flowchart shown in FIG. 4. The CPU performs the steering angle control after completion of parking according to this program.

<Steering Angle Control Routine after Completion of Parking in the Second Embodiment>

As can be seen from the comparisons of FIGS. 4 and 2, steps other than step S30, S60 and S110 are performed as are the corresponding steps in the first embodiment.

In step S30, the CPU reads information of an outside air temperature Tout detected by the outside air temperature sensor. Furthermore, the CPU specifies an expected return amount θr0 of the steering angle of the temperature section to which the outside air temperature Tout belongs by referring to Table 1 on the basis of the outside air temperature Tout, and sets the return amount θr0 of the steering angle in the first steering angle correction control to the specified expected return amount θr0 of the steering angle.

In step S60, the CPU determines whether or not an absolute value of the steering angle θ (=θsn) is equal to or less than the non-control reference value θe. When a negative determination is made, the CPU advances the present control to step S70 in the same manner as the steering angle control in the first embodiment, but when an affirmative determination is made, the CPU advances the present control to the step S110.

In step S110, similarly to the step S80, the CPU calculates a magnitude θrn of a return amount of the steering angle after the nth steering angle correction control is performed. Furthermore, the CPU reads the information of the outside air temperature Tout detected by the outside air temperature sensor, updates the initial value θr0 of the magnitude of the expected return amount of the steering angle of the temperature section in Table 1 to which the outside air temperature Tout belongs with the magnitude θrn of the return amount of the steering angle, and stores it. Incidentally, when step S110 has been completed, the present control once ends.

In the above-described renewal, the initial value θr0 of the magnitude of the expected return amount of the steering angle of the temperature section to which the outside air temperature Tout belongs may be rewritten to the magnitude θrn of the return amount of the steering angle, or may be rewritten to an average value of the value stored in Table 1 and the magnitude θrn of the return amount of the steering angle.

Third Embodiment

Figure 5:
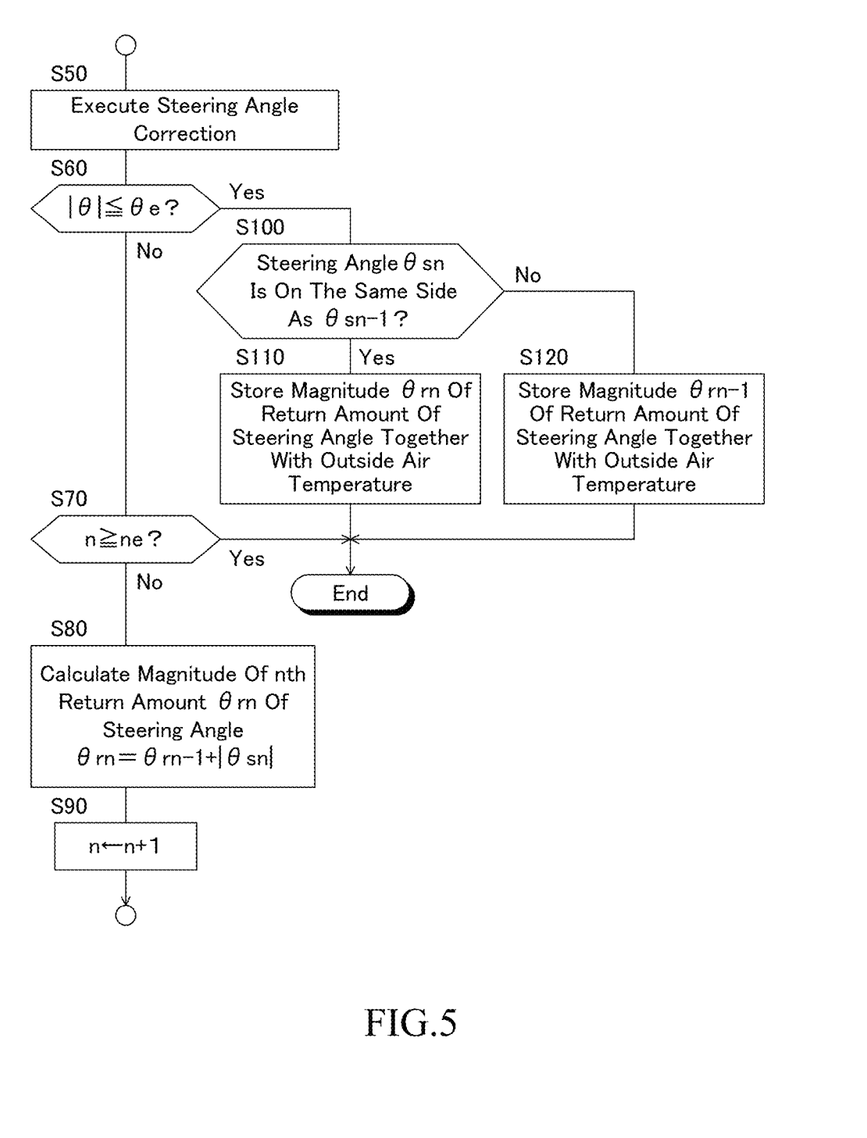
FIG. 5 is a flowchart showing a main part of a routine of the steering angle control after completion of parking in the third embodiment.

In the third embodiment, the ROM of the driving assistance ECU 50 stores a program of the steering angle control after completion of parking corresponding to the flowchart shown in FIG. 5. The CPU performs the steering angle control after completion of parking according to this program.

<Steering Angle Control Routine after Completion of Parking in the Third Embodiment>

As can be seen from the comparisons of FIGS. 5 and 4, steps other than step S60, S100 and S120 are performed as are the corresponding steps in the second embodiment.

In step S60, the CPU determines whether or not an absolute value of the steering angle θ (=θsn) is equal to or less than the non-control reference value θe. When a negative determination is made, the CPU advances the present control to step S70 in the same manner as the steering angle control in the first embodiment, but when an affirmative determination is made, the CPU advances the present control to step S100.

In step S100, the CPU determines whether or not the steering angle θsn is on the same side as the previous steering angle θsn−1 with respect to 0°, which is the target steering angle. When an affirmative determination is made, the CPU advances the present control to the step S110 in the same manner as the steering angle control in the second embodiment, but when a negative determination is made, the CPU advances the present control to the step S120.

In step S120, the CPU reads information of an outside air temperature Tout detected by the outside air temperature sensor, updates the initial value θr0 of the magnitude of the expected return amount of the steering angle of the temperature section in Table 1 to which the outside air temperature Tout belongs with the magnitude θrn−1 of the previous return amount of the steering angle, and stores the updated initial value. Note that the magnitude θrn of the return amount of the steering angle after the nth steering angle correction control has been performed is not calculated, and when step S120 has been completed, the present control once ends.

In the above-described renewal, the initial value θr0 of the magnitude of the expected return amount of the steering angle in the temperature section to which the outside air temperature Tout belongs may be rewritten with the magnitude θrn−1 of the return amount of the steering angle, or it may be rewritten with an average value of the value stored in Table 1 and the magnitude θrn−1 of the return amount of the steering angle.

As understood from the above explanation, according to the embodiments, when the parking has been completed, the first target correction amount θc1 of the steering angle, which is a sum of the magnitude θs0 of a present steering angle and an initial value θr0 of the magnitude of an expected return amount, is calculated (S40). The first steering angle correction control for controlling the EPS device 12 that is the actuating device is performed so that the steering angle θ changes by the first target correction amount of the steering angle toward the side opposite to the present steering angle with respect to 0°, which is the target steering angle (S50).

Therefore, it is possible to increase the possibility of bringing the steering angle closer to the target steering angle as compared to where the EPS device 12 is controlled so that the initial value θr0 of the magnitude of the expected return amount is not considered and the steering angle is changed by the magnitude of the present steering angle.

Further, according to the embodiments, a magnitude θrn of the nth return amount of the steering angle after completion of the nth steering angle correction control is calculated based on a magnitude of the return amount θrn−1 of the steering angle after completion of (n−1)th steering angle correction control and the steering angle θsn after completion of the nth steering angle correction control (S80). In addition, a target amount θcn+1 of the (n+1)th steering angle correction is calculated based on the steering angle θsn after completion of the nth steering angle correction control and the magnitude θrn of the nth return amount of the steering angle (S40). Furthermore, the EPS device 12 is controlled so that the steering angle changes by the (n+1)th target correction amount of the steering angle toward the side opposite to the steering angle θsn after completion of the nth steering angle correction control has been completed with respect to the target steering angle (S50).

Therefore, it is possible to calculate a magnitude θrn of a return amount of the steering angle for each steering angle correction control and repeatedly perform the steering angle correction control (S50) on the basis of the steering angle θsn after completion of the steering angle correction control and the magnitude θrn of the return amount of the steering angle such that the steering angle approaches the target steering angle.

Further, according to the embodiments, when the steering angle θsn after completion of the nth steering angle correction control is within the non-control range (−θe or more and θe or less), the (n+1)th steering angle correction control is not performed (S60). Therefore, it is possible to prevent the steering angle correction control from being performed unnecessarily repeatedly.

Even if the steering angle θsn after completion of the nth steering angle correction control is out of the non-control range (S60), the (n+1)th steering angle correction control is not performed when n is equal to or more than the reference value ne (S70). Therefore, in a situation where the steering angle cannot be brought close to the target steering angle due to an obstacle such as a curb, it is possible to prevent the steering angle correction control from being performed unnecessarily repeatedly.

In particular, according to the second and third embodiments, when the steering angle θsn after completion of the nth steering angle correction control is within the non-control range (S60), the initial value of the expected return amount is updated with the magnitude of the nth return amount of the steering angle (S110). Therefore, since the initial value of the expected return amount can be updated with the magnitude of the return amount of the steering angle when the steering angle correction control has been performed, in contrast to where the initial value of the expected return amount is constant, the steering angle correction control can be performed in accordance with an actual return change of the steering angle.

Further, according to the second and third embodiments, when the steering angle θsn after completion of the nth steering angle correction control is within the non-control range (S60), information of an outside air temperature Tout is acquired, and the initial value of the expected return amount of a temperature section to which the outside air temperature belongs is updated with the magnitude of the nth return amount of the steering angle (S110). Therefore, the initial value of the expected return amount can be updated with the magnitude of the return amount of the steering angle when the steering angle correction control has been performed for each section of the outside air temperature. Since an elastic modulus of tires and other parts fluctuates depending on the outside air temperature and a return amount of the steering angle fluctuates, in contrast to where the initial value of the expected return amount of each section of the outside air temperature is constant, the steering angle correction control can be performed according to an actual return change of the steering angle.

Further, according to the third embodiment, when the steering angle θsn after completion of the nth steering angle correction control is within the non-control range (S60) and the steering angle θsn is a value on the opposite side to the previous steering angle θsn−1 with respect to 0°, which is the target steering angle (S100), the initial value of the expected return amount is updated with the magnitude of the (n−1)th return amount of the steering angle (S120). Therefore, in a situation where the return amount of the steering angle becomes smaller than the correction amount of the steering angle by the steering angle correction control, it is possible to prevent the initial value of the expected return amount from being updated with the smaller return amount of the steering angle.

While the present disclosure has been described in detail with respect to specific embodiments, it will be apparent to those skilled in the art that the present disclosure is not limited to the embodiments described above, and various other embodiments are possible within the scope of the present disclosure.

For example, in the embodiments described above, the target steering angle is 0°, but may be any value within the non-control range or may be any range.

In the first embodiment, the initial value θr0 of the magnitude of the expected return amount is one regardless of the outside air temperature Tout, but as shown in Table 1, the initial value θr0 (a positive constant) of the magnitude of the expected return amount of the steering angle may be set for each of a plurality of sections of the outside air temperature.

In the first embodiment, the initial value er of the magnitude of the expected return amount is not updated, but a magnitude θrn of the return amount of the steering angle after the steering angle correction control has been performed may be calculated in the same manner as in the second and third embodiments, and the initial value θr0 of the magnitude of the expected return amount may be updated with the magnitude θrn of the return amount of the steering angle.

Further, in steps S110 in the second and third embodiments, the initial value θr0 of the magnitude of the expected return amount of the steering angle for the temperature section in Table 1 to which the outside air temperature Tout belongs is updated with the return amount θrn of the steering angle and stored. When setting the initial value θr0 of the magnitude of the expected return amount of the steering angle in step 30 and updating the initial value θr0 in step S110, the type of tires, year and month of use of the tires, a coefficient of friction of a road surface, and the like may be considered.

What is claimed is:

1. A parking assistance device that includes a steering device provided between a steering wheel and steered wheels, an actuating device that automatically steers the steered wheels by actuating the steering device, and an electronic control unit that controls the actuating device, and the electronic control unit being configured to control the actuating device such that a vehicle moves to a target parking position when a command for parking assistance is received, wherein the electronic control unit includes a storage device that stores an expected return amount of a steering angle, and is configured to, when parking has been completed, with a sum of a magnitude of a present steering angle and an initial value of the expected return amount being set as a first target steering angle correction amount, perform a first steering angle correction that controls the actuating device such that the steering angle changes by the first target steering angle correction amount toward the side opposite to the present steering angle with respect to a target steering angle.

2. The parking assistance device according to claim 1, wherein the electronic control unit is configured to, when a steering angle after the (n−1)th steering angle correction control has been completed, where n is a positive integer, exceeds a non-control range, calculate a magnitude of the nth return amount of the steering angle after the nth steering angle correction control has been completed based on a magnitude of the return amount of the steering angle after the (n−1)th steering angle correction control has been completed and a magnitude of the steering angle after the nth steering angle correction control has been completed, calculate a (n+1)th target steering angle correction amount based on the magnitude of the steering angle after the nth steering angle correction control has been completed and the nth return amount of the steering angle, and perform the (n+1)th steering angle correction control for controlling the actuating device such that the steering angle changes by the (n+1)th target steering angle correction amount toward the side opposite to the steering angle after the nth steering angle correction control has been completed with respect to the target steering angle.

3. The parking assistance device according to claim 2, wherein the electronic control unit is configured not to perform the (n+1)th steering angle correction control when a steering angle after the nth steering angle correction control has been completed is within the non-control range, or when a steering angle after the nth steering angle correction control has been completed is outside the non-control range and n is equal to or greater than a reference value.

4. The parking assistance device according to claim 2, wherein the storage device is a non-volatile readable and writable storage device, and the electronic control unit is configured to update an initial value of the expected return amount with the magnitude of the nth return amount of the steering angle when the steering angle after the nth steering angle correction control has been completed is within the non-control range.

5. The parking assistance device according to claim 4, wherein the storage device stores initial values of return amounts of the steering angle for a plurality of outside air temperature sections, and the electronic control unit is configured to, when a steering angle after the nth steering angle correction control has been completed is within the non-control range, acquire information on an outside air temperature, and update the initial value of the return amount of the steering angle for the section to which the outside air temperature belongs with the magnitude of the nth return amount of the steering angle.

* * * * *